United States Patent [19]
Howard et al.

[11] Patent Number: 5,673,839
[45] Date of Patent: Oct. 7, 1997

[54] REAL-TIME FASTENER MEASUREMENT SYSTEM

[75] Inventors: Bruce S. Howard, Mercer Island; James C. Van Avery, Fall City, both of Wash.

[73] Assignee: The Boeing Company, Seattle, Wash.

[21] Appl. No.: 564,717

[22] Filed: Nov. 29, 1995

[51] Int. Cl.$^6$ ........................................... B21J 15/28
[52] U.S. Cl. ................... 227/119; 227/4; 227/51; 227/156; 227/61; 173/21; 29/243.53; 29/525.06; 358/101; 324/242
[58] Field of Search ................. 227/2, 4, 51, 61, 227/112, 119, 154, 156; 173/20, 21; 29/243.54, 243.53, 525.01, 525.05, 525.06, 524.1; 358/101; 324/242, 238, 232

[56] References Cited

U.S. PATENT DOCUMENTS

| | | |
|---|---|---|
| 4,823,396 | 4/1989 | Thompson . |
| 4,828,159 | 5/1989 | Woods . |
| 4,864,713 | 9/1989 | Roberts et al. ................ 29/524.1 |
| 4,877,138 | 10/1989 | Motiwala . |
| 4,885,836 | 12/1989 | Bonomi et al. ................ 227/58 |
| 5,189,514 | 2/1993 | Roden ........................ 358/125 |
| 5,189,808 | 3/1993 | Evans et al. . |
| 5,231,747 | 8/1993 | Clark et al. . |
| 5,372,291 | 12/1994 | Vogeli et al. ................ 227/6 |
| 5,375,754 | 12/1994 | Botha et al. ................ 227/58 |
| 5,398,537 | 3/1995 | Michalewski et al. .......... 29/243.54 |
| 5,399,968 | 3/1995 | Sheppard et al. .............. 324/242 |

Primary Examiner—Scott A. Smith
Attorney, Agent, or Firm—Christensen O'Connor Johnson & Kindness PLLC

[57] ABSTRACT

A real-time fastener measurement system includes an anvil (10) having a striking surface (16) that engages a fastener as it is upset. Three proximity sensors (20) are disposed at 120° intervals around a striking surface of the anvil. A computer system (110) reads the electronic signals produced by the proximity sensors just after the fastener has been upset and converts the signals to digital values. The computer stores a piecewise linear function that has been predetermined for each sensor and uses the function to convert the digital values of the proximity sensor to fastener head height.

18 Claims, 8 Drawing Sheets

REAL-TIME FASTENER MEASUREMENT SYSTEM

FIELD OF THE INVENTION

The present invention relates to riveting machines in general, and in particular to a system for measuring the height of an installed flush head fastener.

BACKGROUND OF THE INVENTION

Despite the increased use of composite materials and adhesives in aircraft, the majority of aircraft parts are still held together with rivet-type fasteners. To install a fastener, a riveting machine drills a hole in the workpieces to be secured. The hole is countersunk and a fastener is placed in the hole. An anvil is placed on the head of the fastener while the base of the shank of the fastener is upset or crushed to form a button that holds the workpieces together.

To ensure a quality joint, it is important that the fastener be placed at the proper depth in the workpiece. If the countersink is too deep, the rivet joint ultimately created could be weakened and subject to corrosion. If the countersink is too shallow, the head can create aerodynamic drag. Additionally, paint adhesion is poor over a head that is too high.

At The Boeing Company, the assignee of the present invention, it is required that most exterior skin fasteners have a head height that is between 0.001 inches and 0.007 inches above the surface of a workpiece. However, it has been determined that an optimum head height should be 0.002±0.0005 inches to provide the best cosmetic appearance.

With currently available riveting equipment, a riveting machine operator can only check head heights periodically. For example, the machine operator will install approximately 50 fasteners on a workpiece and then check the heights of the installed fasteners with a manual gauge. The head heights are recorded and the construction of the workpiece continues. If the head heights are nearing the limits of the engineering specifications, countersink depth of the riveting machine can be adjusted. If a fastener is completely outside engineering specifications, the fastener is marked to be drilled out and repaired at a later time. This procedure is time consuming and labor intensive.

SUMMARY OF THE INVENTION

The present invention is a real-time fastener measurement system, i.e., a system that provides an immediate indication of the fastener head height as the fastener is being installed. The operator of the riveting machine can make minor adjustments as required in order to ensure uniformity of head heights. Since the head height can be automatically determined and recorded, the time to produce a workpiece is decreased, thereby reducing the overall labor cost of producing an aircraft while improving overall quality of the finished product.

In the system of the present invention, an anvil is mounted in a conventional riveting machine to brace a fastener head as the shank is upset. The anvil includes a strike surface that engages the head. Three eddy current proximity sensors surround the strike surface.

A proximity sensor interface circuit measures a change in the output signals of the proximity sensors as the sensors are moved close to a metal object. The change in the output signal is converted to a DC voltage, which is digitized by a computer system. The computer system uses a piecewise linear equation to convert the digitized output signal into an indication of the fastener head height. The piecewise linear equation is calculated by building a test coupon containing fasteners of varying head heights. The heights are measured with the proximity sensors and with a manual gauge. The manually determined head heights are correlated to a value produced by the proximity sensor and interpolated to calculate the linear equation.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

As indicated above, the present invention is a rivet height detection system that provides an indication of rivet head height as a rivet is installed.

Figure 1:
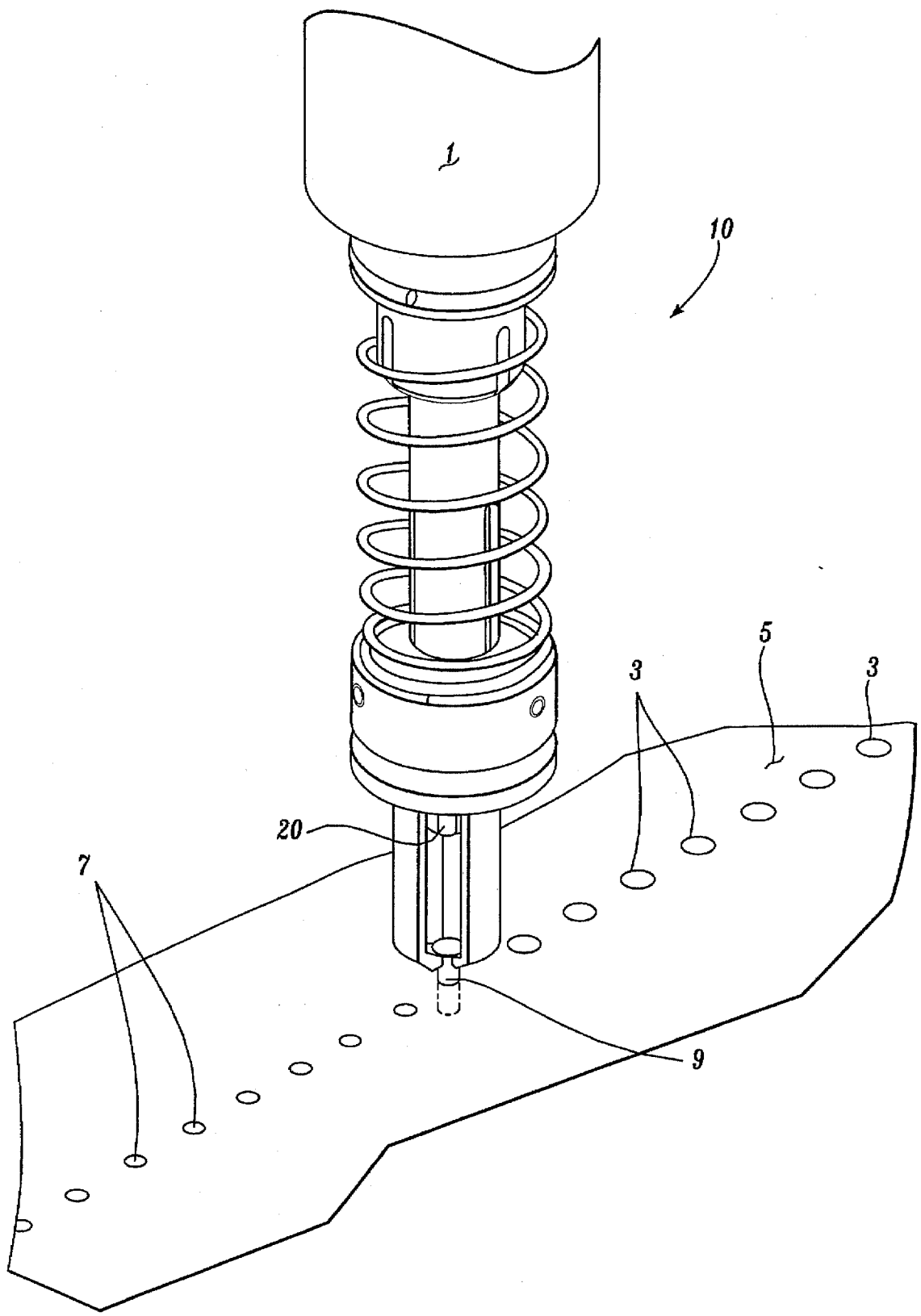
FIG. 1 is an isometric view of a rivet head anvil according to the present invention that includes a plurality of proximity sensors.

Turning now to FIG. 1, a rivet head driver or anvil 10 according to the present invention operates to secure a fastener or rivet 3 within a workpiece 5. The anvil 10 fits within a conventional fastener installing or riveting machine 1 such as a GEMCOR G400 or those produced by Brötje Automation. For purposes of this invention, only a portion of the riveting machine is shown. The riveting machine automatically drills a hole 7 within the workpiece 5 and countersinks the hole. The drill motor of the riveting machine is moved out of the way and the anvil 10 inserts a new fastener 9 into the hole. For purposes of illustration, the fastener installed is a rivet having a head portion and a shank that is upset by the riveting machine to form a fastener joint. The anvil secures the rivet in the hole while the shank of the rivet is upset to form a button thereby completing the fastener joint. As will be described in further detail below, a number of non-contact displacement or proximity sensors 20 surround the anvil in order to measure the height of the rivet head during installation.

Figure 2:
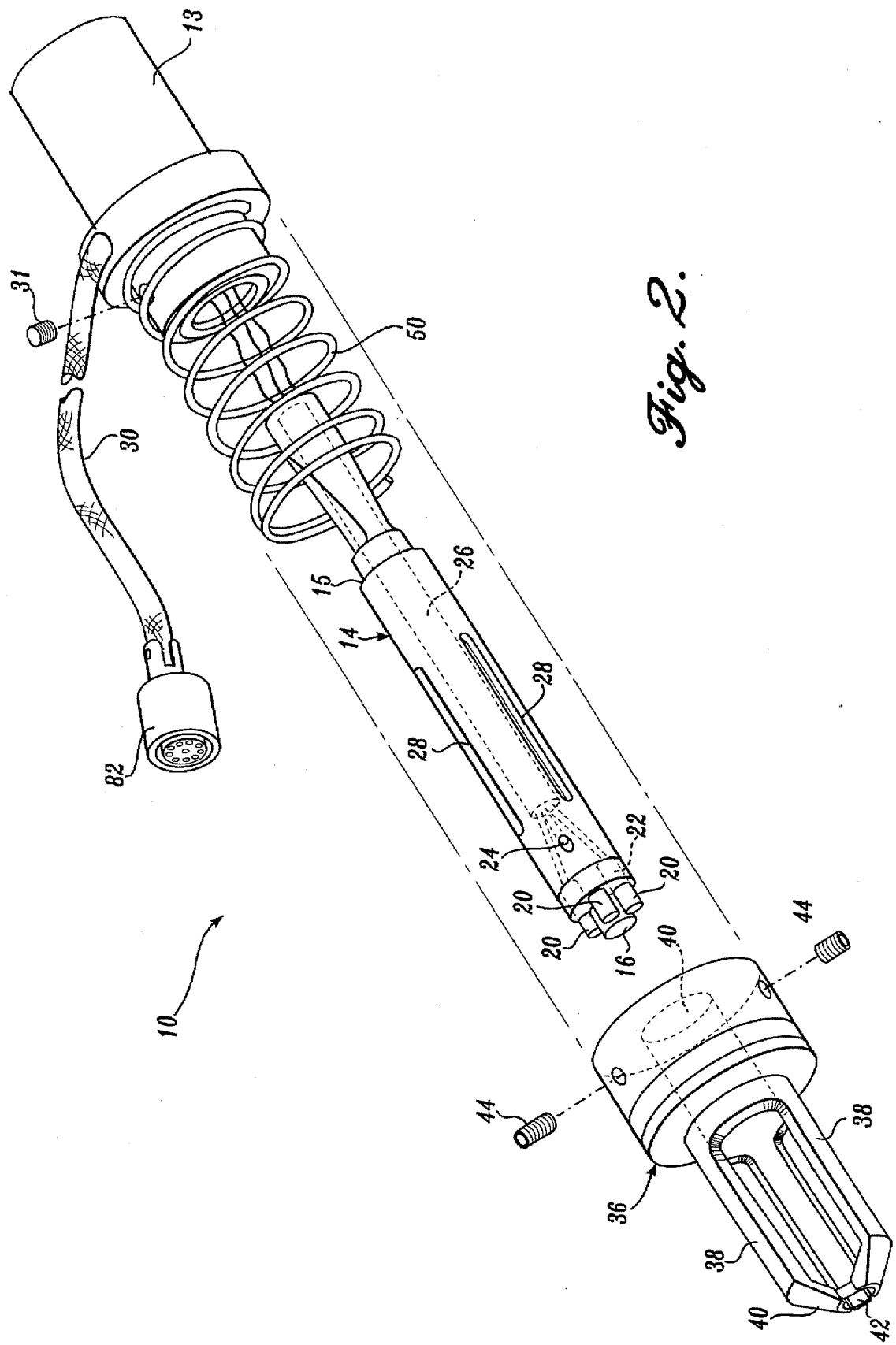
FIG. 2 is an exploded isometric view of a rivet head anvil according to the present invention.

As shown in FIG. 2, the anvil includes a cylindrical holder 13 that is used to secure the anvil to the remainder of the riveting machine. The anvil further includes a central shaft 14 having a smooth rivet striking surface 16 at its end remote from the holder that is used to brace the head of a rivet as it is upset to form a button. A set screw 31 secures the shaft 14 to the holder 13.

Surrounding the rivet striking surface 16 are three proximity sensors 20, which provide an indication of the height of the rivet head above the surface of the workpiece in which the rivet is installed. The proximity sensors are disposed at points located 120° apart about the circumference of the striking surface 16 and are set back slightly from the rivet striking surface to prevent damage to the sensors as a rivet is installed.

Each of the proximity sensors 20 is secured within a bore 22 that extends lengthwise along a portion of the shaft. The proximity sensors are held in the bore 22 with a wax or adhesive that allows the sensors to be repositioned if they become misaligned during the riveting process. Each of the bores 22 meet with a diagonal bore 24 that extends from the outer surface of the shaft inward toward the center of the shaft 14. Each bore 22 and the associated diagonal bore 24 forms an elbow through which a miniature coaxial cable is routed to carry the output signals of the proximity sensors 20. A central bore 26 within the shaft 14 meets the diagonal bores 24 and routes the coaxial cables from the proximity sensors to a reinforced cable 30 that terminates at an electrical connector 82. The reinforced cable couples the wires from the sensors to a sensor conditioning box, described in further detail below, that contains circuitry to convert the electrical signals from the proximity sensors to a DC voltage that is proportional to the rivet head height.

In order to grip the rivets as they are being positioned in a hole, the anvil 10 includes a rivet positioner 36 disposed at the distal end of the shaft 14. The rivet positioner 36 has three fingers 38 disposed at 120° intervals around the positioner that hold a rivet with a friction fit until the rivet can be placed in the hole. The fingers are positioned so that the proximity sensors 20 fit between the fingers 38 as the rivet is being upset.

The rivet positioner 36 is secured to the shaft 14 using three slots 28 that are cut lengthwise on the exterior of the shaft. A central bore 40 extending through the rivet positioner allows it to fit over the rivet striking surface 16 of the shaft. A set of three set screws 44 extend from the positioner 36 into the slots 28 to secure it onto the shaft while allowing it to slide along the length of the shaft. Each of the fingers 38 terminates at an inwardly extending tip 40 that holds a rivet to be installed in a workpiece. Each of the tips 40 has a concave depression 42 at the point where the tip engages the rivet shank to prevent it from becoming dislodged as the position of the anvil 10 is adjusted over the hole in which the rivet is to be placed. In the presently preferred embodiment of the invention, the rivet positioner 36 and fingers 38 are made of a durable plastic material such as PEEK, however, other plastics or suitable metals could be used.

A helical compression spring 50 encircles the shaft 14. One end of the spring engages the holder 13 while the other end biases the rivet positioner 36 in the direction of the rivet striking surface 16.

Figure 3:
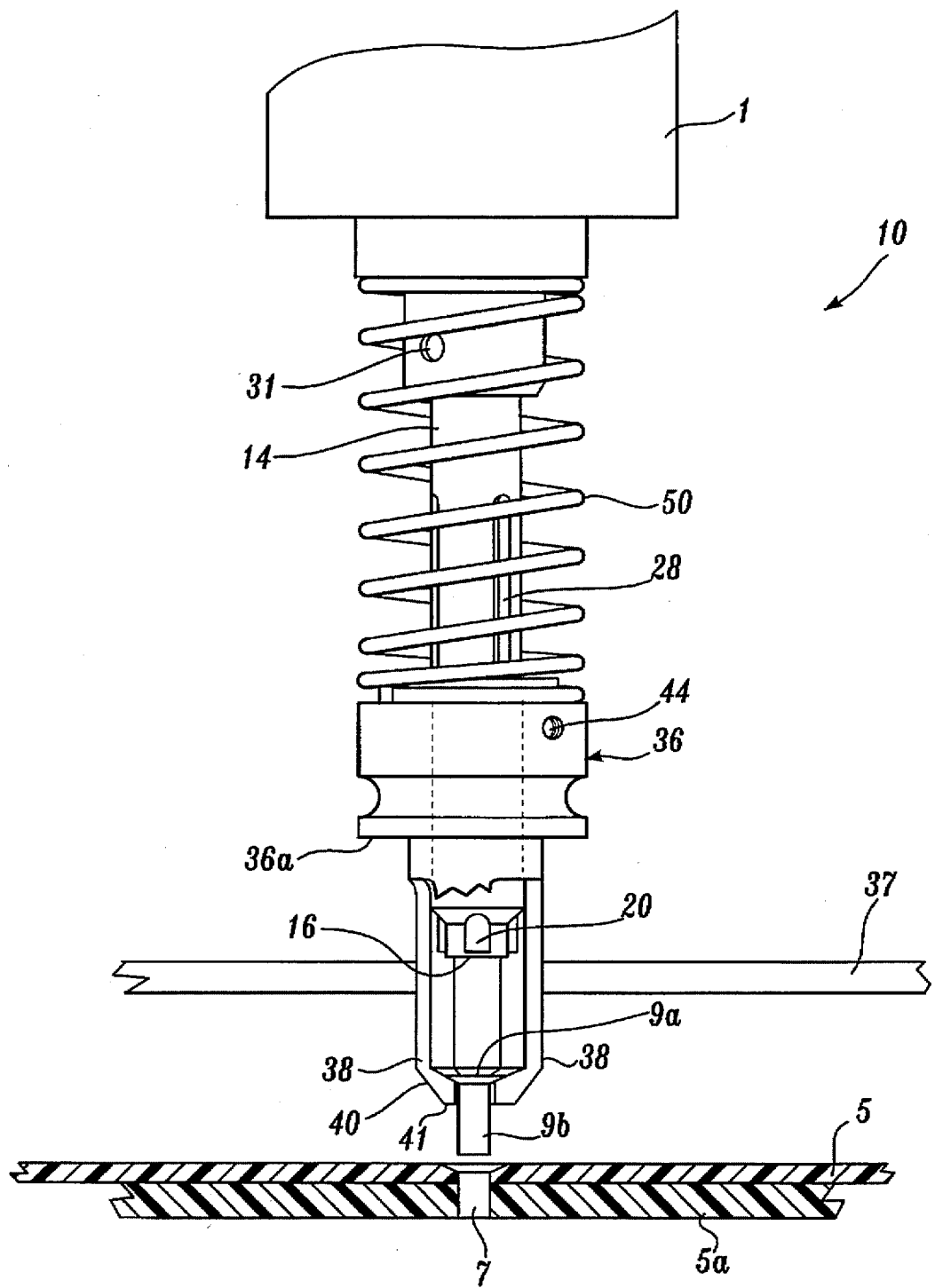
FIG. 3 is a side elevation illustrating how the rivet head anvil of the present invention operates to install a rivet in a workpiece.

FIG. 3 illustrates how the anvil 10 of the present invention operates to place a rivet 9 in a hole 7 that is drilled in a pair of workpieces 5 and 5A. As indicated above, the riveting machine predrills the hole 7 with a countersink before the anvil 10 is moved over the hole. The rivet 9 includes a shank 9b that is secured in the rivet positioner 36 by the tips 40 of fingers 38 and is positioned over the hole 7. In this position, the spring 50 is fully extended.

Figure 4:
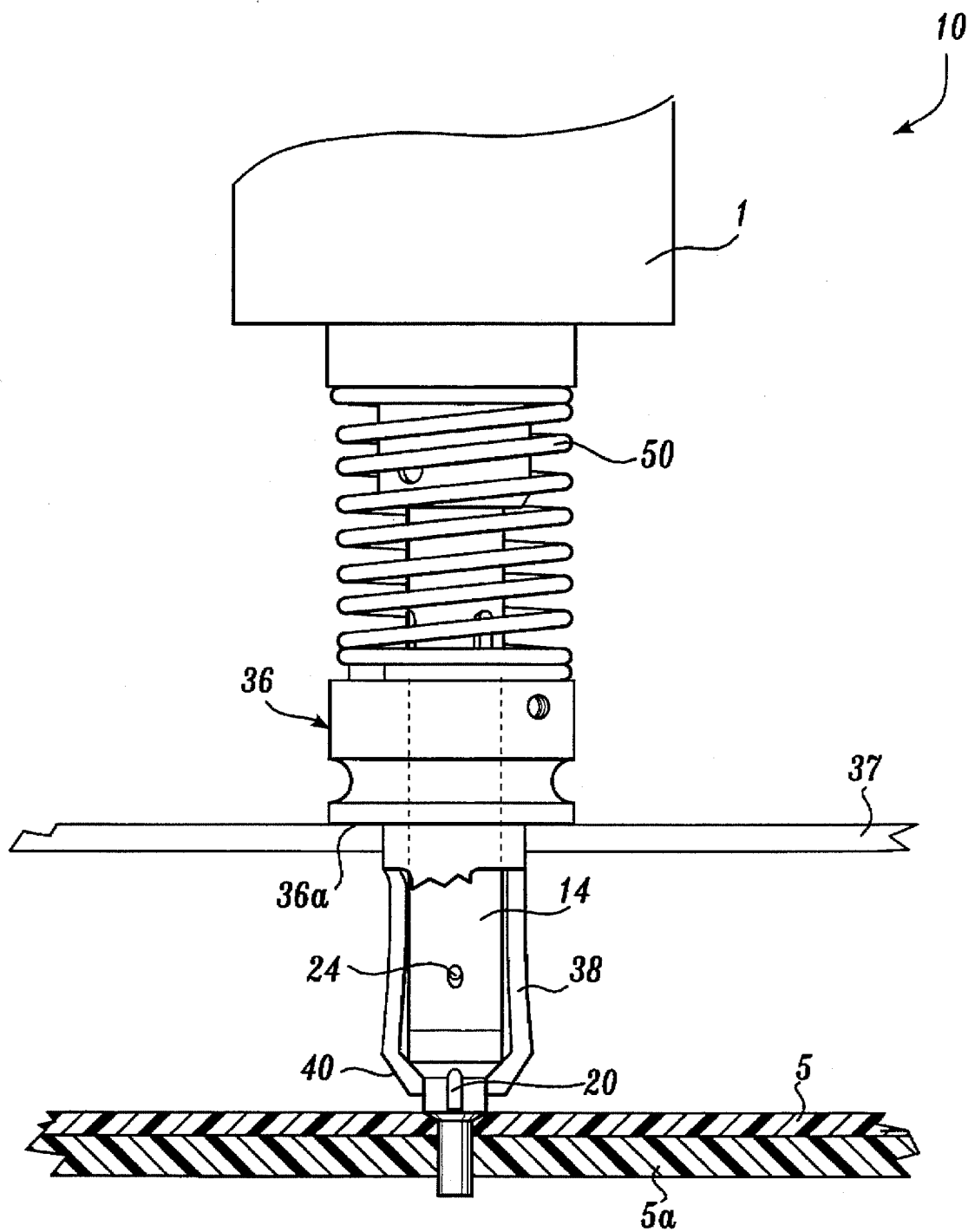
FIG. 4 is a side elevation corresponding to FIG. 7, but illustrating how the rivet head anvil of the present invention secures a fastener in a workpiece as the shank is upset.

As best viewed in FIG. 4, the anvil 10 is moved from a position above the workpiece downward until the bottommost surface 41 of the tip 40 engages the workpiece 5. As the upper portion of the anvil is moved further downward, the bottom surface 36a of the rivet positioner engages a top surface of a pressure foot bushing 37 (see FIGS. 3 and 4) thereby compressing the spring 50. The central shaft 14 continues to move downward until the strike surface 16 engages the head 9 and the rivet. The strike surface causes the tips 40 to spread radially outward in order to release the rivet 9 into the hole 7. The top of the anvil continues moving downward until the rivet head seats in the hole. The anvil is then locked in place by the riveting machine and the shank 9b of the rivet is upset by a bottom anvil or striker (not shown), thereby forming a button to secure the first workpiece 5 to the second workpiece 5A.

As the anvil 10 is moved away from the installed fastener, the spring 50 expands, moving the rivet positioner 36 toward the distal end of the anvil, thereby causing the tips 40 of the fingers 38 to move past the strike surface 16 so that the rivet positioner is ready to receive another rivet.

As indicated above, the present invention operates to measure the height of the fastener head above the surface of the workpiece in which it is installed. When the strike surface 16 is engaged with the top of the rivet, the proximity sensors 20 are positioned adjacent to the rivet head near the surface of the top workpiece 5. By monitoring the output signals of the proximity sensors, the present invention determines the final height of the rivet head above the surface of the workpiece.

Figure 5:
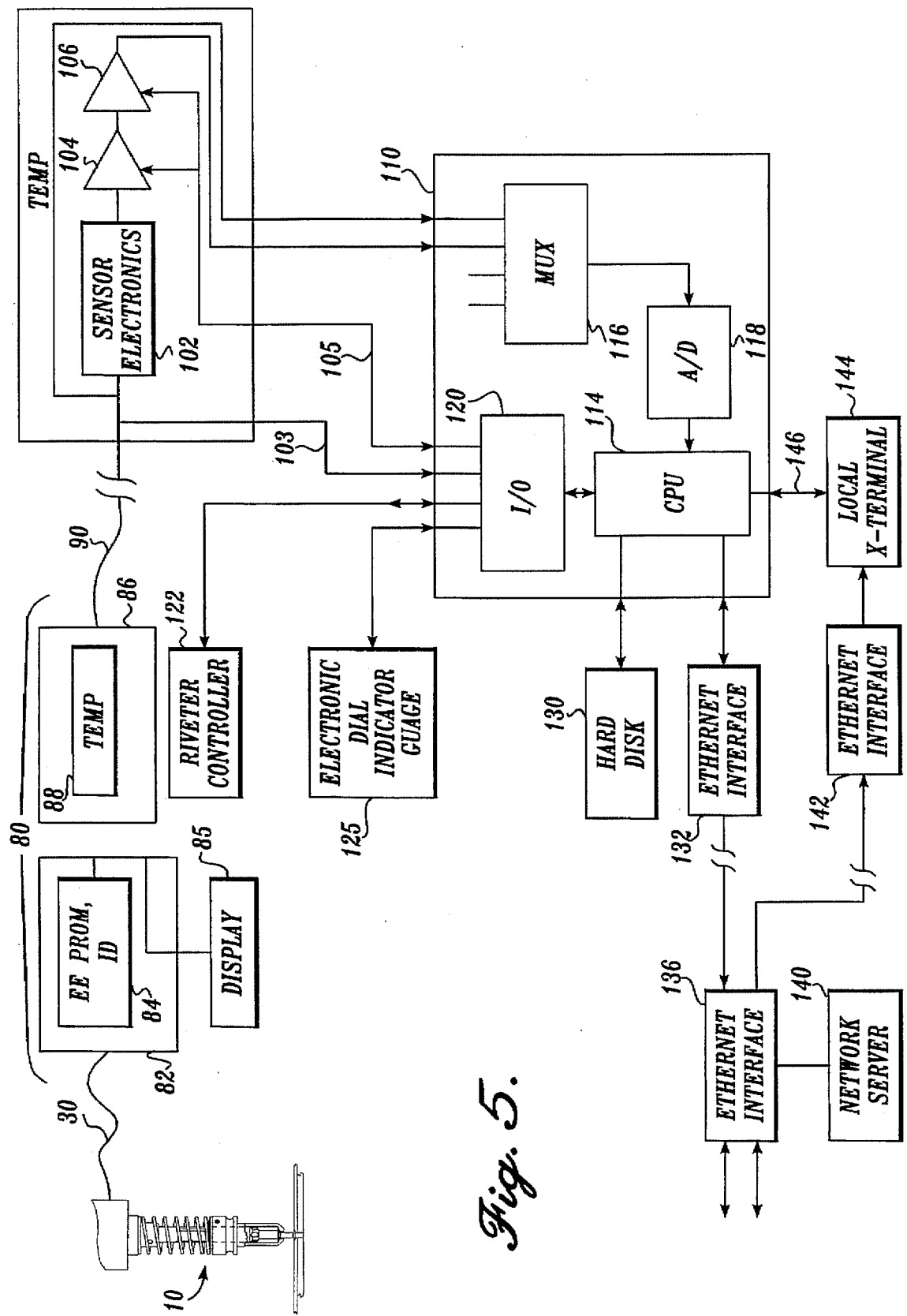
FIG. 5 is a block diagram of a real-time fastener measurement system according to the present invention.

FIG. 5 is a block diagram of the fastener head height detection system according to the present invention. As discussed above, the output signals from the three proximity sensors are carried on three miniature coaxial cables that are routed through the reinforced cable 30 to an electrical connector located at the riveting machine. The electrical connector 80 comprises two mating members 82 and 86. The first member 82 is connected to the reinforced cable 30 while a second member 86 is connected to a cable bundle 90 that extends to a sensor conditioning unit 100. Inside the first member 82 is a serial EEPROM and ID circuit 84 that stores a unique ID number for the anvil 10, as well as a set of gain and offset values that are used to condition the signals from the proximity sensors. A temperature sensor 88 is disposed in the second member 86 to allow the system to compensate for variations in temperature that occur at the riveting machine.

The output signals from the proximity sensors, the serial EEPROM and ID circuit 84 and the temperature sensor 88 are routed by the cable bundle 90 to the sensor conditioning unit 100. The output signal from each of the proximity sensors is applied to a sensor interface circuit 102, which produces a DC voltage that is proportional to the proximity of a metal object to the tip of the proximity sensor. The sensor conditioning unit 100 actually includes three sensor interface circuits 102, one for each proximity sensor; however, only one interface circuit is shown.

In the presently preferred embodiment of the invention, the proximity sensors used are eddy current sensors model No. 0.55 U series 7000 available from Kaman Instrumentation Corp., Colorado Springs, Colo. The sensor interface circuit 102 is a model No. SMU-9000B that is also available from Kaman Instrumentation Corp. However, those skilled in the art will recognize that other types of proximity sensors could be used.

The sensor interface circuit 102 generates an AC signal that is applied to the associated proximity sensor. As the sensor is moved closer to or farther away from a metal object, the inductance of the proximity sensor changes, thereby changing the frequency of the applied AC signal. The change in frequency is detected by the sensor interface circuit 102 and converted into a DC voltage that is proportional to the change in frequency. The DC output signal from the sensor interface circuit 102 is applied to a programmable attenuator 104 and an offset adjusting circuit 106. The programmable attenuator 104 and offset adjusting circuit 106 are calibrated for each proximity sensor so that the output signal of the sensor interface circuit varies in a known range with the distance of the proximity sensor to a metal object.

The output signals produced within the sensor conditioning unit 100 are fed to a computer system 110 that is remote from the riveting machine. The computer system 110 includes a central processing unit 114 as well as its own internal memory. The output signals produced by the sensor interface circuits and the temperature sensor are applied to a multiplexer 116 that selects one of the signals and applies the selected signal to an analog-to-digital converter 118, which converts the analog signal into a corresponding digital signal. The output of the analog-to-digital converter 118 is fed to the central processing unit 114 to read and interpret.

When a new anvil is inserted into the riveting machine, and the connector 80 is assembled, the CPU reads the ID, gain, and offset values stored in the EEPROM and ID circuit 84. The gain and offset values stored in the EEPROM as well as the unique ID number stored in the ID circuit are transmitted over the cable bundle 90 to the signal conditioning box 100 and forwarded to the computer system over a set of leads 103 that connect the signal conditioning box to an input-output port 120 in the computer system 110. The computer system 110 uses the input-output port 120 to transmit the gain and offset signals on a set of leads 105 that connect the input-output port 120 to the programmable attenuator 104 and offset circuit 106. The gain and offset are predetermined for each proximity sensor so that the DC voltage produced by the sensor interface circuit 102 varies in a known range. The values for the gain and offset are determined in a laboratory when the proximity sensors are installed in an anvil. The values for the gain and offset will remain the same until the sensors are moved or damaged, in which case the values will have to be redetermined and rewritten in the EEPROM.

The computer system 110 also includes a memory storage device such as a hard disk 130. The hard disk is used to store a file for each anvil that can be connected to the computer system. The file includes a mathematical description of a best fit line that is used to convert the digital signals derived from the proximity sensors into a corresponding rivet head height.

The computer system 110 is also coupled to a local area network through an ethernet interface 132, which is used to transmit signals to a remotely located ethernet interface 136 associated with a network server computer 140. The computer system 110 also includes a local X-terminal 144 including monitor and keyboard that is used to provide visual displays of the rivet height to an operator as well as other displays related to the operation of the riveting machine. The local X-terminal 144 can be driven from both the remotely located network server computer 140 through an ethernet interface 142 and from the CPU 114 using a set of serial lines 146.

A display 85 is positioned adjacent to the riveting machine to provide an operator with an immediate indication of the rivet height as the rivet is installed. By viewing the display 85, a rivet machine operator can make adjustments to the machine to ensure that the rivet heights remain within specifications. In addition, if the height is out of specification, the computer system 110 can send a signal to a machine controller 122 that inhibits the operation of the riveter until the machine has been adjusted.

Before the proximity sensors can be used to detect the height of an installed rivet, they must be calibrated. After the values for the gain and offset are read for the anvil, and the programmable attenuator 104 and offset circuit 106 have been properly set, the digital signals produced by each sensor must be calibrated to an exact rivet head height. To calibrate the sensors, the operator of the riveting machine builds a "coupon" or test piece that contains rivets of varying head heights. The coupon material is of the same alloy and surface finish as the workpiece to be riveted. As the rivets are installed, the computer system reads and stores the output signal of the analog-to-digital converter for each sensor. This process is repeated until a minimum of five fasteners are installed in the coupon. After all the rivets of varying head heights have been installed, the operator is prompted by the computer system to manually measure the height of each rivet with an electrical dial indicator gauge 125, at positions corresponding to the location of the proximity sensors (i.e., every 120°). The readings from the dial indicator are read by the computer system through the input-output port 120 and matched with a corresponding analog-to-digital converter reading.

Figure 6:
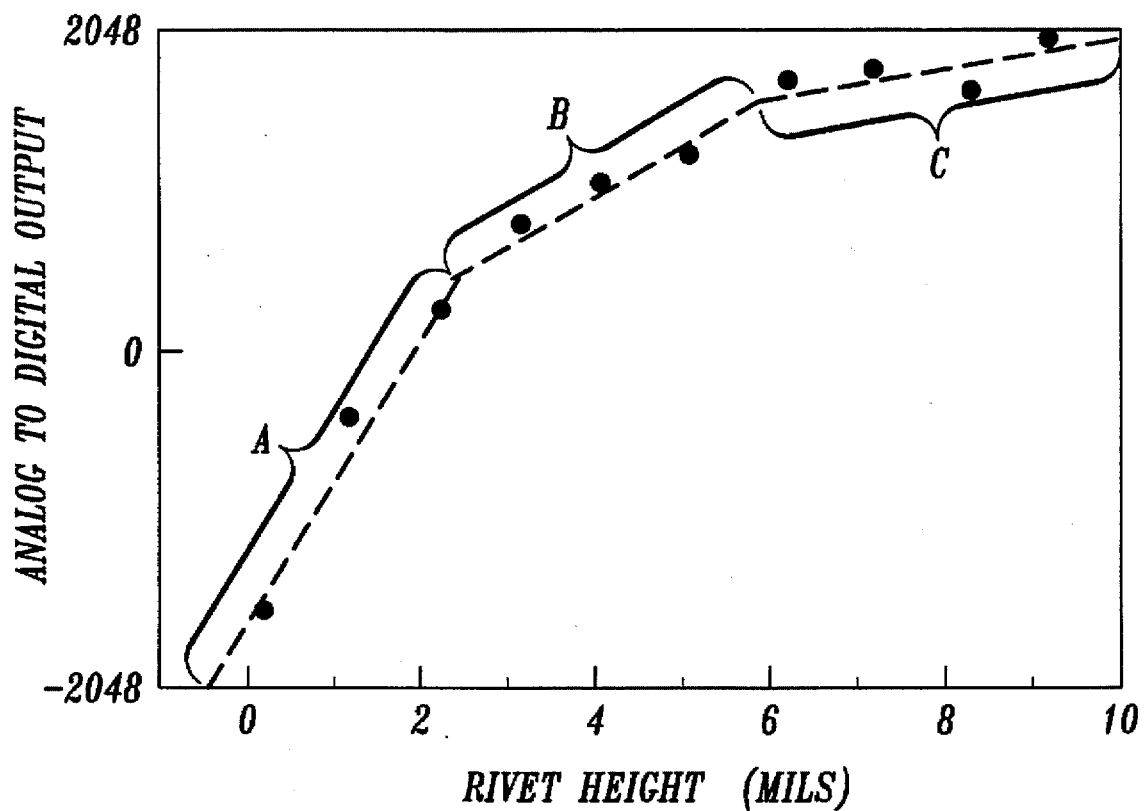
FIG. 6 is a graph showing how the output signal of a proximity sensor within the rivet head anvil varies with fastener head height.

As shown in FIG. 6, the output signals of the proximity sensors form a curve that varies in a logarithmic fashion with rivet head height. As the computer matches a reading of the electronic dial indicator gauge with a digitized output signal of the proximity sensor, a piecewise linear function is constructed in order to calculate the rivet head height. The piecewise linear function may comprise several straight line segments such as segments A, B, C that are calculated by the CPU 114 to fit the readings obtained with the manual dial indicator gauge. Once calculated, the piecewise linear function is stored in the file associated with each anvil on the hard disc 130. The piecewise linear function is assumed to be valid for the anvil as long as the sensors on the anvil do not become damaged or while the anvil is used on the same riveting machine. If the anvil is swapped to a different machine, it would be necessary for an operator to build a new test coupon so that the output signal of the proximity sensors can be recalibrated. In addition, the piecewise linear function may be adjusted for variations in temperature measured at the machine according to techniques well known in the art.

Figure 7A:
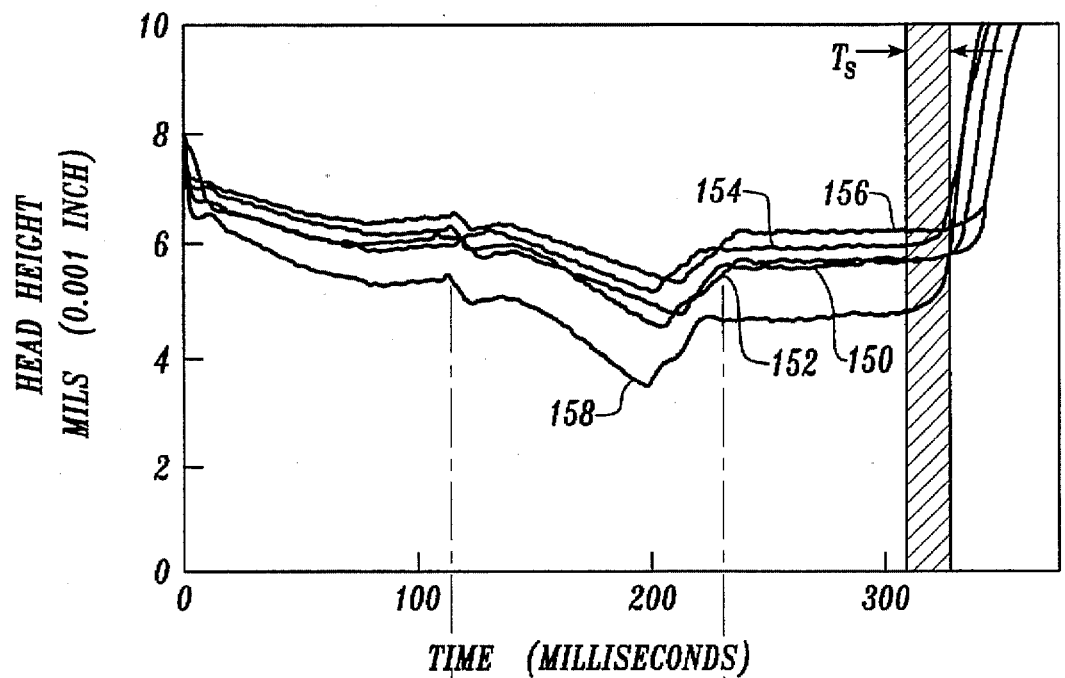
FIG. 7 is a graph showing the output signals of the proximity sensors as a fastener is upset.
Figure 7B:

FIG. 7 is a timing diagram showing when the present invention samples the output signals of the proximity sensors to determine the rivet head height. The computer system 110 is coupled to the machine controller 122 (FIG. 5) that controls the operation of the riveting machine. The computer system monitors the logic level of two signals, "Anvil Forward" which indicates that the drilling portion of the process is complete and that the anvil containing the fastener is moved down to the workpiece. The "Upset Cycle" signal indicates that the bottom anvil is moved up to upset the shank of the rivet.

As seen in FIG. 7, when the "Anvil Forward" signal drops from the logic high to low, the readings produced by the proximity sensors decrease as the rivet is inserted into the hole. The rivet is crushed during the time when the "Upset Cycle" signal is logic low. It should be noted that just before the "Upset Cycle" signal returns to a logic high state the proximity sensors produce their lowest reading. This is because the metal around the rivet is being cupped toward the sensors by the pressure of the bottom anvil upsetting the rivet.

After the "Upset Cycle" signal returns to logic high, the computer system waits about 110 milliseconds to allow any mechanical ringing or oscillation in the machine to dampen out. The readings of the proximity sensors are then taken and averaged over a time period, $T_S$, beginning approximately 310 milliseconds after the "Anvil Forward" signal drops from logic high to logic low. The signals sampled during the time period, $T_S$, are used with the piecewise linear function to produce an indication of rivet head height.

FIG. 7 is an actual graph of the signals received from the three proximity sensors during the installation of a rivet. The lines 150, 152, and 154 are the readings from the output sensors, while the line 156 represents the highest point on the rivet head above the surface of the workpiece and the line 158 represents the lowest point of the rivet head above the workpiece.

As will be appreciated, because the sensing system measures three points about each rivet, it is possible to mathematically compute the plane in which the rivet height is lying. Because the rivet dimensions are known, the highest and lowest points on the rivet head can be calculated. These points may not always line up with a sensor, depending on the orientation of the installed rivet.

Figure 8:
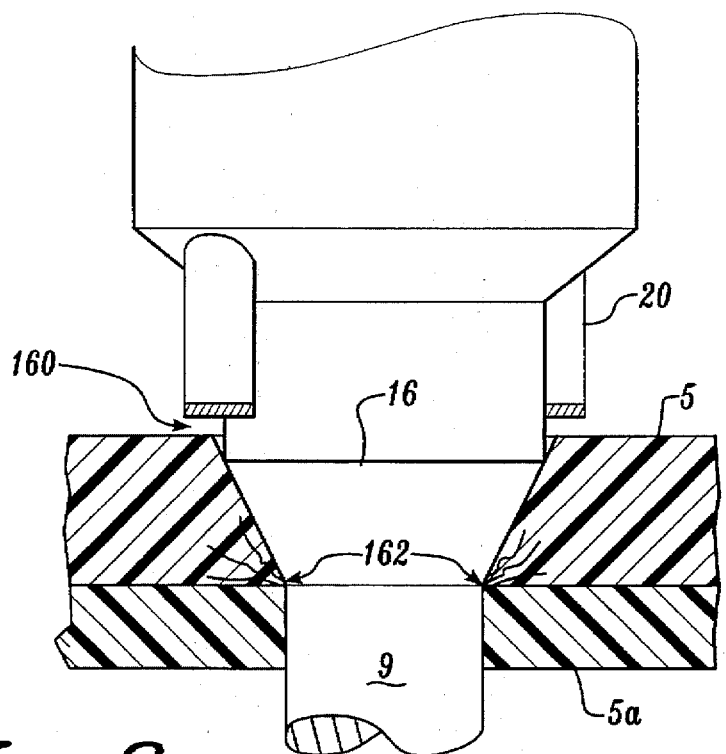
FIG. 8 is an enlarged fragmentary side elevation showing a fastener that is installed too deeply in a workpiece.

FIG. 8 is a cross-sectional view of the anvil according to the present invention that has installed a rivet too deep within a workpiece 5, such as would occur if the countersink produced by the drill is too deep. As described above, the distal ends of the proximity sensors 20 are set back from the striking surface 16 of the anvil so that the proximity sensors are not damaged if a rivet is installed too deeply. The proximity sensors measure a gap 160 that is correlated to a rivet head height using the piecewise linear function calculated for each sensor. The problem with a rivet that is installed too deeply is that it may form a "knife edge" 162 in the workpiece. This "knife edge" is subject to corrosion that can weaken the joint. By immediately detecting that the fastener height is too low, the rivet machine operator can adjust the depth of the countersink to bring the next fastener to the correct head height.

Figure 9:
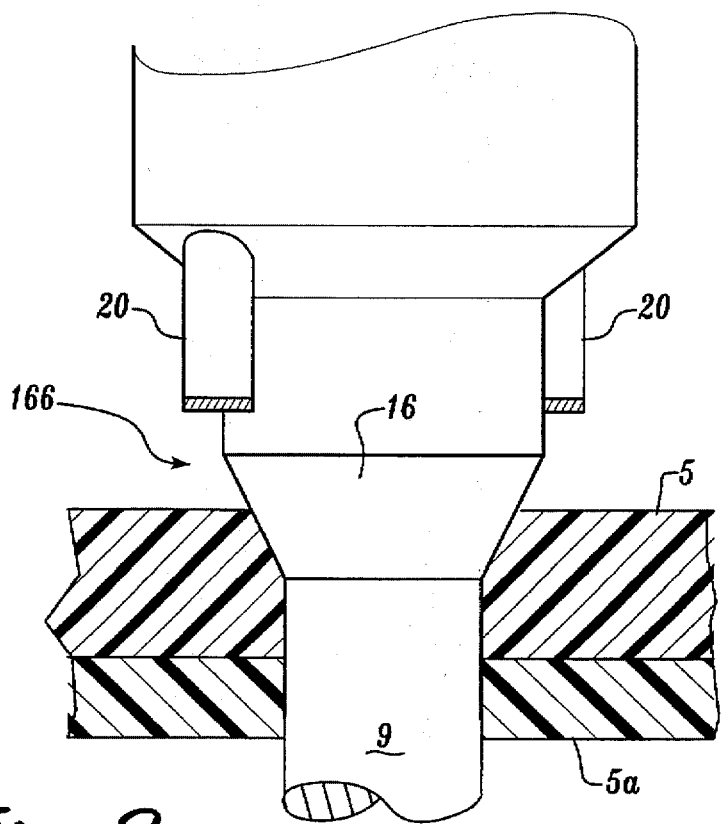
FIG. 9 is an enlarged fragmentary side elevation corresponding to FIG. 8, but showing a fastener that is installed with its head too high above the surface of a workpiece.

FIG. 9 shows the relationship between the proximity sensors 20 and the surface of a workpiece 5 for a rivet that has not been installed deeply enough. The proximity sensors 20 measure a gap 162 that is correlated to a rivet head height using the piecewise linear function described above. Rivets that are too high create aerodynamic drag on the aircraft. In addition, it is difficult to paint over such fasteners.

Using the real-time fastener head measuring system of the present invention, the computer system can immediately alert an operator to potential problems that exist in the riveting machine. Additionally, the heights of each installed rivet can be transmitted to the central computer system in order to perform statistical process control. Because the operator does not need to manually check the rivet head heights, the time required to produce a workpiece is reduced. Additionally, it is much easier to ensure uniformity of fastener head heights.

While the preferred embodiment of the invention has been illustrated and described, it will be appreciated that various changes can be made therein without departing from the spirit and scope of the invention. For example, although the riveting process has been described with respect to the aircraft industry, it is recognized that riveting machines used in other industries could benefit from the present invention. In addition, the present invention can be used to detect the head height of other types of fasteners, such as bolts that are secured using a lock nut or collar, in order to insure that the countersink depth is correct. Therefore, the scope of the invention is to be determined solely from the following claims.

The embodiments of the invention in which an exclusive property or privilege is claimed are defined as follows:

1. A system for real-time detection of the height of a fastener head above the surface of a workpiece, comprising:
   an anvil adapted to be secured in a riveting machine, the anvil including a strike surface to engage a head of a fastener to be installed in the workpiece by the riveting machine, the anvil further including at least one proximity sensor disposed adjacent to the strike surface of the anvil;
   a sensor interface circuit coupled to the at least one proximity sensor, the sensor interface circuit producing an output signal indicating the distance between the at least one proximity sensor and a surface of the workpiece; and
   a computer system for receiving the output signal of the sensor interface circuit and for converting the output signal into an indication of fastener head height.

2. The system of claim 1, wherein there are three proximity sensors disposed adjacent to the strike surface of the anvil.

3. The system of claim 2, wherein the three proximity sensors are spaced equiangularly around a circumference of the strike surface.

4. The system of claim 1, wherein the anvil includes a memory chip that stores a unique identification number that identifies the anvil and one or more gain and offset values, the sensor interface circuit including a programmable attenuator and an offset adjust circuit that are set by the computer system according to the gain and offset values stored in the memory chip.

5. The system of claim 4, wherein the computer system stores a mathematical equation for each proximity sensor that converts the output signal of the sensor interface circuit to a fastener head height indication signal display.

6. The system of claim 1, wherein the at least one proximity sensor is an eddy current sensor.

7. The system of claim 1, wherein the anvil includes a fastener positioner that grasps a fastener while it is being installed in the workpiece, the positioner including a plurality of fingers that surround a fastener, the fingers being positioned such that as the fastener is installed in a hole on the workpiece, the strike surface engages an inner surface of the fingers to move the fingers radially outward in order to release the fastener.

8. The system of claim 7, wherein the fastener positioner is slidably secured to the anvil.

9. Apparatus, for use with an automated fastener installing machine that includes a driver having an anvil surface for backing up a fastener head and a tool for deforming the fastener shank to form a button on the fastener end opposite the head during the fastener installation process, for determining dimensional relationships between the fastener and the surface of a workpiece in which the fastener is being installed, said apparatus comprising:
   a plurality of non-contact displacement sensors each including a sensing element and a sensor interface circuit, each of said sensing elements being attached to one end of said driver proximate to and recessed from said anvil surface in a known, fixed relationship, each sensing element being electrically connected to its associated sensor interface circuit, each non-contact displacement sensor being operative to provide a digital sensor output signal representative of the straight line distance from the sensing element to the nearest point on the surface of the workpiece in which the fastener is being installed; and a programmed computer communicating with each of said non-contact displacement sensors and receiving said digital sensor output signals for computing and displaying, for each fastener, dimensions associated with said fastener installation process contemporaneous with said fastener installation process.

10. Apparatus, as set forth in claim 9, wherein said sensor interface circuits have programmable gain and offset stages.

11. Apparatus, as set forth in claim 9, wherein said non-contact displacement sensors are eddy current sensors and said eddy current sensors output an analog signal to said associated sensor interface circuit.

12. Apparatus, as set forth in claim 9, wherein said plurality of non-contact displacement sensors comprise three non-contact displacement sensors each arranged in a plane perpendicular to a longitudinal axis of the driver and spaced equiangularly about a periphery of said driver anvil surface.

13. Apparatus, as set forth in claim 9, wherein said sensor interface circuit comprises a programmable amplifier and offset adjust circuit for operation under computer control, and an analog to digital converter.

14. Apparatus, as set forth in claim 13, further comprising a data storage means in said programmed computer for storing a mathematical function for each of the individual non-contact displacement sensors attached to the driver, the mathematical function operating to convert the output signal of the non-contact displacement sensors into an indication of the fastener height.

15. Apparatus, as set forth in claim 9, further comprising an identification element attached to said driver, and communicating with and capable of being interrogated electronically by said programmed computer for enabling said programmed computer to uniquely identify said driver and associate scaling and calibration parameters contained in said database with the particular non-contact displacement sensors installed on the identified driver.

16. Apparatus, as set forth in claim 15, wherein said identification element is an integrated circuit that responds to electronic interrogation by providing a unique identification code.

17. A method for determining the magnitude of individual dimensions associated with installed fasteners relative to a fastened assembly, contemporaneous with fastener installation by an automated fastening machine having an associated programmed computer and a driver which has a plurality of non-contact displacement sensors and an identification element, comprising the steps of:

reading the identification element to determine which driver and attached non-contact displacement sensors are presently installed on the automated fastening machine;

determining if the non-contact displacement sensors have been calibrated;

calibrating the sensors if the sensors have not previously been calibrated;

inserting a fastener in a hole within the assembly to be fastened;

determining a processing window during which the automated fastening machine is installing the fastener into the assembly and collecting non-contact displacement sensor data from an analog-to-digital converter during that window;

calculating the displacement of the fastener in the fastened assembly;

comparing the calculated displacement with a predetermined acceptable displacement;

determining if said calculated displacement is within a predetermined acceptable range of deviation from said acceptable displacement; and inhibiting the fastening machine if said calculated displacement is outside said acceptable range of displacement.

18. The method for determining the magnitude of individual dimensions associated with installed fasteners relative to a fastened assembly, contemporaneous with fastener installation by an automated fastening machine as set forth in claim 17 wherein the steps of calibrating the sensors further comprise the steps of:

building a calibration coupon with a plurality of fasteners of different displacements;

measuring the fastener displacement with a manual gauge and with the non-contact displacement sensors;

correlating the measurement obtained with the manual gauge with those obtained from the non-contact displacement sensors; and calculating a mathematical function which relates the measurements obtained from the non-contact displacement sensors with a fastener height.

* * * * *